(12) United States Patent
Arekapudi et al.

(10) Patent No.: US 9,519,483 B2
(45) Date of Patent: *Dec. 13, 2016

(54) GENERATING FLAGS FOR SHIFTING AND ROTATION OPERATIONS IN A PROCESSOR

(75) Inventors: Srikanth Arekapudi, Sunnyvale, CA (US); Saurabh Gupta, Uttar Pradesh (IN)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 1070 days.

This patent is subject to a terminal disclaimer.

(21) Appl. No.: 13/334,286

(22) Filed: Dec. 22, 2011

(65) Prior Publication Data

US 2013/0166889 A1 Jun. 27, 2013

(51) Int. Cl.
*G06F 9/30* (2006.01)

(52) U.S. Cl.
CPC ....... *G06F 9/30094* (2013.01); *G06F 9/30032* (2013.01)

(58) Field of Classification Search
CPC .................................................. G06F 9/30032
USPC .................................. 712/221, 223; 708/209
See application file for complete search history.

(56) References Cited

U.S. PATENT DOCUMENTS

| 5,379,240 A * | 1/1995 | Byrne ........................... 708/209 |
| 5,781,457 A * | 7/1998 | Cohen ..................... G06F 7/575 708/231 |
| 5,862,065 A * | 1/1999 | Muthusamy .............. G06F 7/02 708/521 |
| 6,807,625 B1 * | 10/2004 | Knebel ............... G06F 9/30014 712/221 |
| 6,912,560 B2 * | 6/2005 | Goldovsky ............. G06F 7/508 708/525 |
| 7,783,692 B1 * | 8/2010 | Wong ........................ G06F 5/01 708/200 |
| 2005/0283479 A1 * | 12/2005 | Wahl et al. ....................... 707/9 |
| 2008/0307204 A1 * | 12/2008 | Tam .................... G06F 9/30032 712/210 |

OTHER PUBLICATIONS

Intel, IA-32 Intel Architecture Software Developer's Manual, Sep. 2005, vol. 1, p. 3-13 to 3-16, p. 3-20 to 3-22 and vol. 2B, p. 4-190 to 4-195, p. 4-235 to 4-240.*
IEEE 100, The Authoritative Dictionary of IEEE Standards Terms, 2000, IEEE press, 7th ed, pp. 30, 50 & 638.*

* cited by examiner

*Primary Examiner* — Andrew Caldwell
*Assistant Examiner* — Yuqing Xiao
(74) *Attorney, Agent, or Firm* — Volpe and Koenig, P.C.

(57) ABSTRACT

A method and apparatus are described for generating flags in response to processing data during an execution pipeline cycle of a processor. The processor may include a multiplexer configured to generate valid bits for received data according to a designated data size, and a logic unit configured to control the generation of flags based on a shift or rotate operation command, the designated data size and information indicating how many bytes and bits to rotate or shift the data by. A carry flag may be used to extend the amount of bits supported by shift and rotate operations. A sign flag may be used to indicate whether a result is a positive or negative number. An overflow flag may be used to indicate that a data overflow exists, whereby there are not a sufficient number of bits to store the data.

18 Claims, 8 Drawing Sheets

```
                        Bit Positions (Data Size = EAX)

SHL EAX, 17          31.30.29.28.27.26.25.24.23.22.21.20.19.18.17.16.15.14.13.12.11.10.09.08.07.06.05.04.03.02.01.00

Valid Bits           31.30.29.28.27.26.25.24.23.22.21.20.19.18.17.16.15.14.13.12.11.10.09.08.07.06.05.04.03.02.01.00

Rotated Data         14.13.12.11.10.09.08.07.06.05.04.03.02.01.00.31.30.29.28.27.26.25.24.23.22.21.20.19.18.17.16.15

Rotate/Shift Result  14.13.12.11.10.09.08.07.06.05.04.03.02.01.00.ze.ze.ze.ze.ze.ze.ze.ze.ze.ze.ze.ze.ze.ze.ze.ze

|<---- byte 3 - NC ---->|<---- byte 2 - PC ---->|<---- byte 1 - CC ---->|<---- byte 0 - CC ---->| ze = Zero
                                                    NC = Not Changed
                                                    PC = Partially Changed
                                                    CC = Completely Changed
                                                    SHL = Shift Left
```

FIG. 5A

SHR EAX, 17          31.30.29.28.27.26.25.24.23.22.21.20.19.18.17.16.15.14.13.12.11.10.09.08.07.06.05.04.03.02.01.00
Valid Bits           31.30.29.28.27.26.25.24.23.22.21.20.19.18.17.16.15.14.13.12.11.10.09.08.07.06.05.04.03.02.01.00
Rotated Data         16.15.14.13.12.11.10.09.08.07.06.05.04.03.02.01.00.31.30.29.28.27.26.25.24.23.22.21.20.19.18.17
Rotate/Shift Result  ze.ze.ze.ze.ze.ze.ze.ze.ze.ze.ze.ze.ze.ze.ze.31.30.29.28.27.26.25.24.23.22.21.20.19.18.17

|<---- byte 3 - CC ---->|<---- byte 2 - CC ---->|<---- byte 1 - PC ---->|<---- byte 0 - NC ---->|

Bit Positions (Data Size = EAX)

ze = Zero  
NC = Not Changed  
PC = Partially Changed  
CC = Completely Changed  
SHR = Shift Right

GENERATING FLAGS FOR SHIFTING AND ROTATION OPERATIONS IN A PROCESSOR

CROSS REFERENCE TO RELATED APPLICATIONS

This application is related to U.S. patent application Ser. No. 13/315,380 filed on Dec. 9, 2011, the contents of which are hereby incorporated by reference herein.

FIELD OF INVENTION

This application is related to the design of a processor.

BACKGROUND

Dedicated pipeline queues have been used in multi-pipeline execution (EX) units of processors, (e.g., central processing units (CPUs), graphics processing units (GPUs), and the like), in order to achieve faster processing speeds. In particular, dedicated queues have been used in conjunction with EX units having multiple EX pipelines that are configured to execute different subsets of a set of supported micro-operations, (i.e., micro-instructions). Dedicated queuing has generated various bottlenecking problems and problems for the scheduling of micro-operations that required both numeric manipulation and retrieval/storage of data.

Processors are conventionally designed to process operations that are typically identified by operation (Op) codes (OpCodes), (i.e., instruction codes). In the design of new processors, it is important to be able to process all of a standard set of operations so that existing computer programs based on the standardized codes will operate without the need for translating operations into an entirely new code base. Processor designs may further incorporate the ability to process new operations, but backwards compatibility to older operation sets is often desirable.

Operations (Ops) represent the actual work to be performed. Operations represent the issuing of operands to implicit (such as add) or explicit (such as divide) functional units. Operations may be moved around by a scheduler queue.

Operands are the arguments to operations, (i.e., instructions). Operands may include expressions, registers or constants.

Execution of micro-operations (uOps) is typically performed in an EX unit of a processor core. To increase speed, multi-core processors have been developed. To facilitate faster execution throughput, "pipeline" execution of operations within an execution unit of a processor core is used. Cores having multiple execution units for multi-thread processing are also being developed. However, there is a continuing demand for faster throughput for processors.

One type of standardized set of operations is the operation set compatible with "x86" chips, (e.g., 8086, 286, 386, and the like), that have enjoyed widespread use in many personal computers. The micro-operation sets, such as the x86 operation set, include operations requiring numeric manipulation, operations requiring retrieval and/or storage of data, and operations that require both numeric manipulation and retrieval/storage of data. To execute such operations, execution units within processor cores have included two types of pipelines: arithmetic logic pipelines ("EX pipelines") to execute numeric manipulations, and address generation (AG) pipelines ("AG pipelines") to facilitate load and store operations.

In order to quickly and efficiently process operations as required by a particular computer program, the program commands are decoded into operations within the supported set of micro-operations and dispatched to the EX unit for processing.

A shifter in the EX unit may perform several x86 instructions that require shifting or rotating the data in a register or data from memory, e.g., rotate left (ROL), rotate right (ROR), shift left (SHL), which is identical to shift arithmetic left (SAL), shift right (SHR), shift arithmetic right (SAR), and the like. These instructions may be 8-bit, 16-bit, 32-bit or 64-bit operations.

A method and apparatus are needed to improve the latency of shift operation execution by shifting or rotating this data and generating results and flags within a single phase or half-cycle to meet high core frequency targets and limited silicon area.

SUMMARY OF EMBODIMENTS

A method and apparatus are described for generating flags in response to processing data during an execution pipeline cycle of a processor. The processor may include a multiplexer configured to generate valid bits for received data according to a designated data size, and a logic unit configured to control the generation of flags based on a shift or rotate operation command, the designated data size and information indicating how many bytes and bits to rotate or shift the data by. A carry flag may be used to extend the amount of bits supported by shift and rotate operations. A sign flag may be used to indicate whether a result is a positive or negative number. An overflow flag may be used to indicate that a data overflow exists, whereby there are not a sufficient number of bits to store the data.

The shift or rotate operation command may indicate that the received data is to be rotated to the left or right, or is to be shifted to the left or right.

The flags may include a carry flag, an overflow flag and a sign flag. The carry flag may be set to a last bit shifted or rotated out when the received data is shifted by an amount of bits less than the designated data size.

The received data may be shifted by an amount of bits equal to the designated data size, the carry flag may be set to the most significant bit (MSB) of the received data for right shifts, and the carry flag may be set to the least significant bit (LSB) of the received data for left shifts.

The received data may be shifted by an amount of bits greater than the designated data size, the carry flag may be set to the MSB of the received data, if a shift arithmetic right (SAR) operation is performed, and the carry flag may be set to a logic zero if an SAR is not performed.

The received data may be shifted to the right by one bit, and the overflow flag may be set to the MSB of the received data, if a shift right (SHR) operation is performed.

If the received data is shifted or rotated to the left, the overflow flag may be set to an XOR function of the MSB of the shifted or rotated data, and the carry flag.

If the received data is rotated to the right, the overflow flag may be set to an XOR function of the MSB of the rotated data and the second-most significant bit (MSB−1) of the rotated data.

A shift arithmetic right (SAR) operation may be performed on the received data, and the overflow flag may be set to a logic zero.

If the received data is rotated to the left, the sign flag may be set to the MSB of the rotated data.

An SHL operation may be performed on the received data without shifting the received data by an amount of bits more than the designated data size, and the sign flag may be set to the MSB of the shifted data.

An SAR or SHR operation may be performed on the received data without shifting the received data, and the sign flag may be set to the MSB of the received data.

An SHR operation may be performed on the received data by shifting the received data by at least one bit, and the sign flag may be set to a logic zero.

A computer-readable storage medium may configured to store a set of instructions used for manufacturing a semiconductor device, wherein the semiconductor device comprises a multiplexer configured to generate valid bits for received data according to a designated data size, a rotator array configured to insert the valid bits into at least one of a plurality of bit positions and rotate the valid bits in a predetermined direction by a designated number of bit positions, and a logic unit configured to control the generation of flags based on a shift or rotate operation command, the designated data size and information indicating how many bytes and bits to rotate or shift the data by. The instructions may be Verilog data instructions or hardware description language (HDL) instructions.

A computer-readable storage medium may be configured to store data processed during an execution pipeline cycle by generating valid bits for received data according to a designated data size, and controlling the generation of flags based on a shift or rotate operation command, the designated data size and information indicating how many bytes and bits to rotate or shift the data by.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Figure 1:
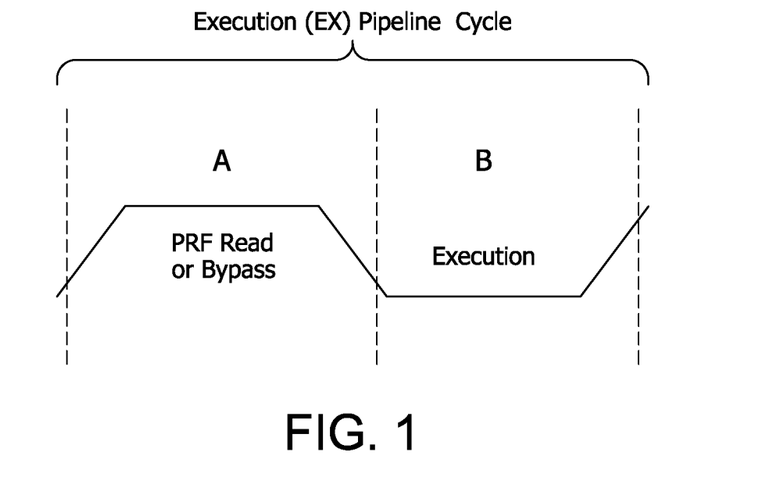
FIG. 1 shows an example of an execution (EX) pipeline cycle of a processor performing a multi-cycle operation.
Figure 2:
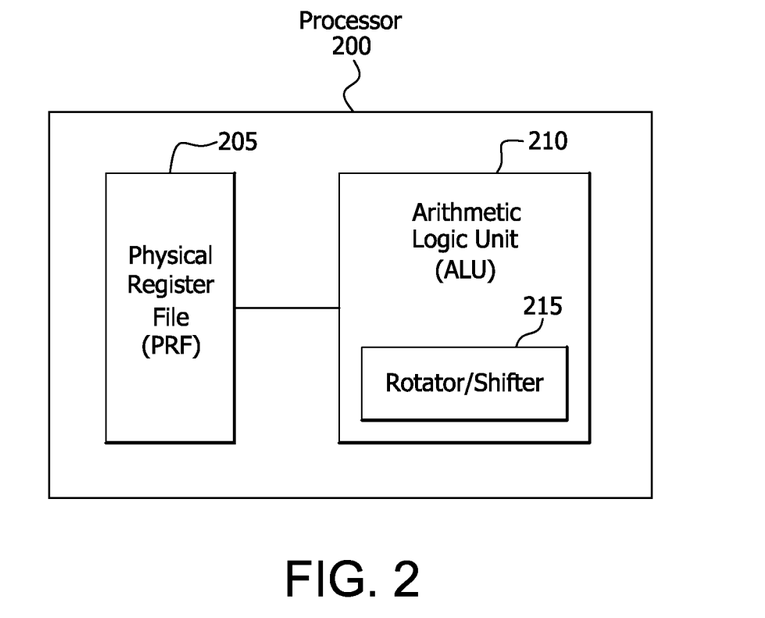
FIG. 2 shows an example block diagram of the processor used to perform the EX pipeline cycle of FIG. 1.

FIG. 1 shows an example of an EX pipeline cycle of a processor performing a multi-cycle operation. FIG. 2 shows an example block diagram of a processor 200 configured to perform the multi-cycle operation of FIG. 1. The processor 200 may include a physical register file (PRF) and an arithmetic logic unit (ALU) 210 including a rotator/shifter 215. In phase A of the EX pipeline cycle, a PRF read or bypass operation may be performed, whereby data associated with a uOp may be read from the PRF 205. In phase B of the EX pipeline cycle, execution may be implemented by the rotator/shifter 215 in the ALU 210 to execute the data read from the PRF.

Figure 3A:
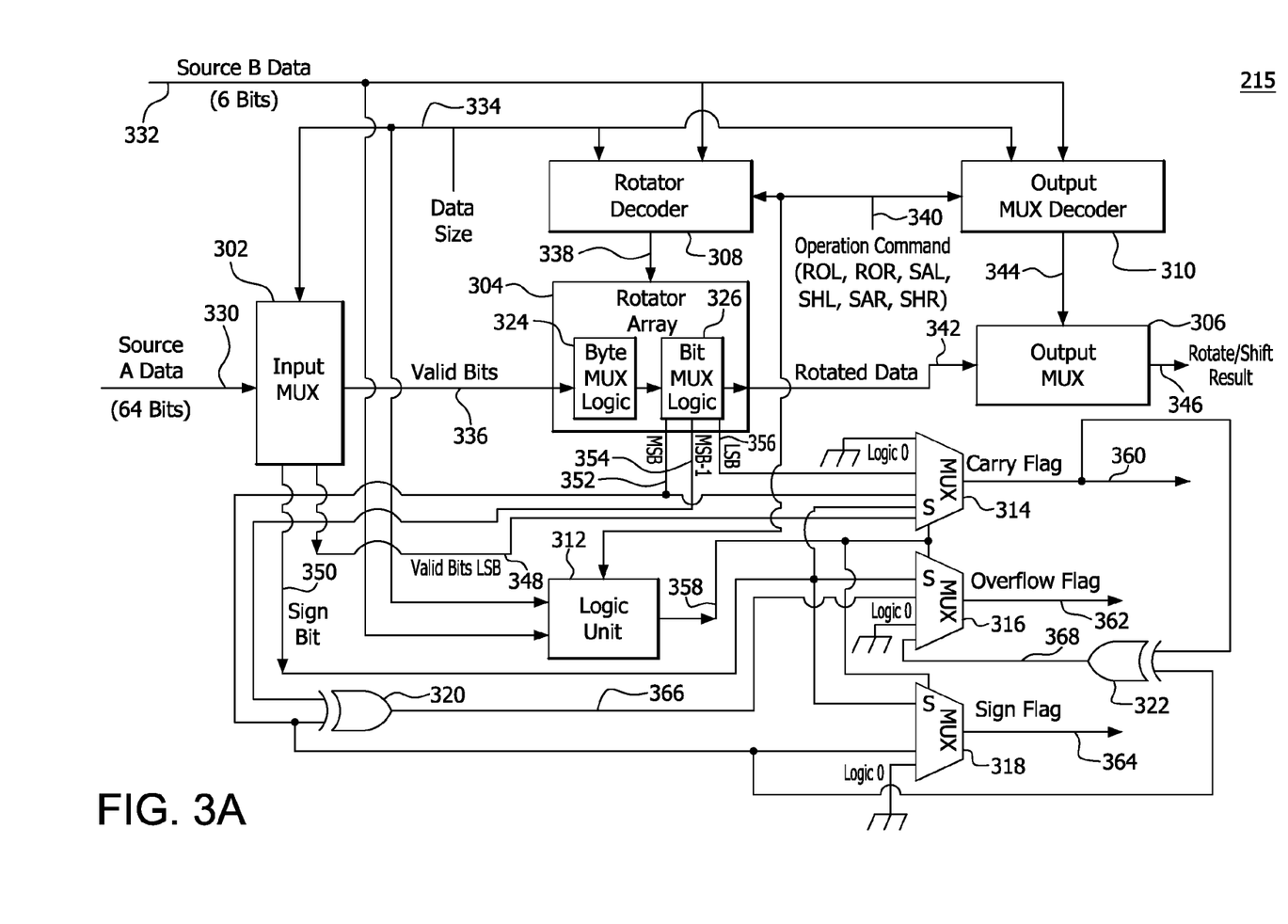
FIG. 3A shows an example block diagram of a rotator/shifter that generates a carry flag, an overflow flag and a sign flag.

FIG. 3A shows an example block diagram of the rotator/shifter 215 in the ALU 210 of the processor 200 shown in FIG. 2. The rotator/shifter 215 may be configured to process data received from two different sources "A" and B". The rotator/shifter 215 may include an input multiplexer (MUX) 302, a rotator array 304, an output MUX 306, a rotator decoder 308, an output MUX decoder 310, a logic unit 312, multiplexers (MUXes) 314, 316 and 318, and XOR gates 320 and 322. The rotator array 304 may include byte MUX logic 324 and bit MUX logic 326. Source A data 330 is input to the input MUX 302 for rotation and shifting by the rotator/shifter 215. Source B data 332, (i.e., rotation and shifting information), is input into the rotator decoder 308 and the output MUX decoder 310 to control the amount of rotation and shifting.

In an example used throughout the following description of operation of the rotator/shifter 215, the source A data 330 may include 64 bits, of which a portion, (e.g., 8 bits, 16 bits or 32 bits), or all of the bits, (e.g., 64 bits), may be valid. The number of valid bits may be designated by a data size instruction 334 that is input to the input MUX 302 and the rotator decoder 308, whereby an "AL" data size represents a "low byte" data size indicating that 8 bits (07 through 00) are valid and bits 63 through 08 are invalid; an "AH" data size represents a "high byte" data size indicating that 8 bits (15 through 08) are valid and bits 63 through 16, and 07 through 00, are invalid; an "AX" data size represents a data size indicating 16 bits (15 through 00) are valid and bits 63 through 16 are invalid; an "EAX" data size represents a data size indicating 32 bits (31 through 00) are valid and bits 63 through 32 are invalid; and an "RAX" data size represents a data size indicating that all of the 64 bits (63 through 00) are valid. Thus, the input MUX 302 may be configured to arrange (i.e., manipulate) the source A data 330 and output valid bits 336 to the rotator array 304 for rotation.

Figure 4:
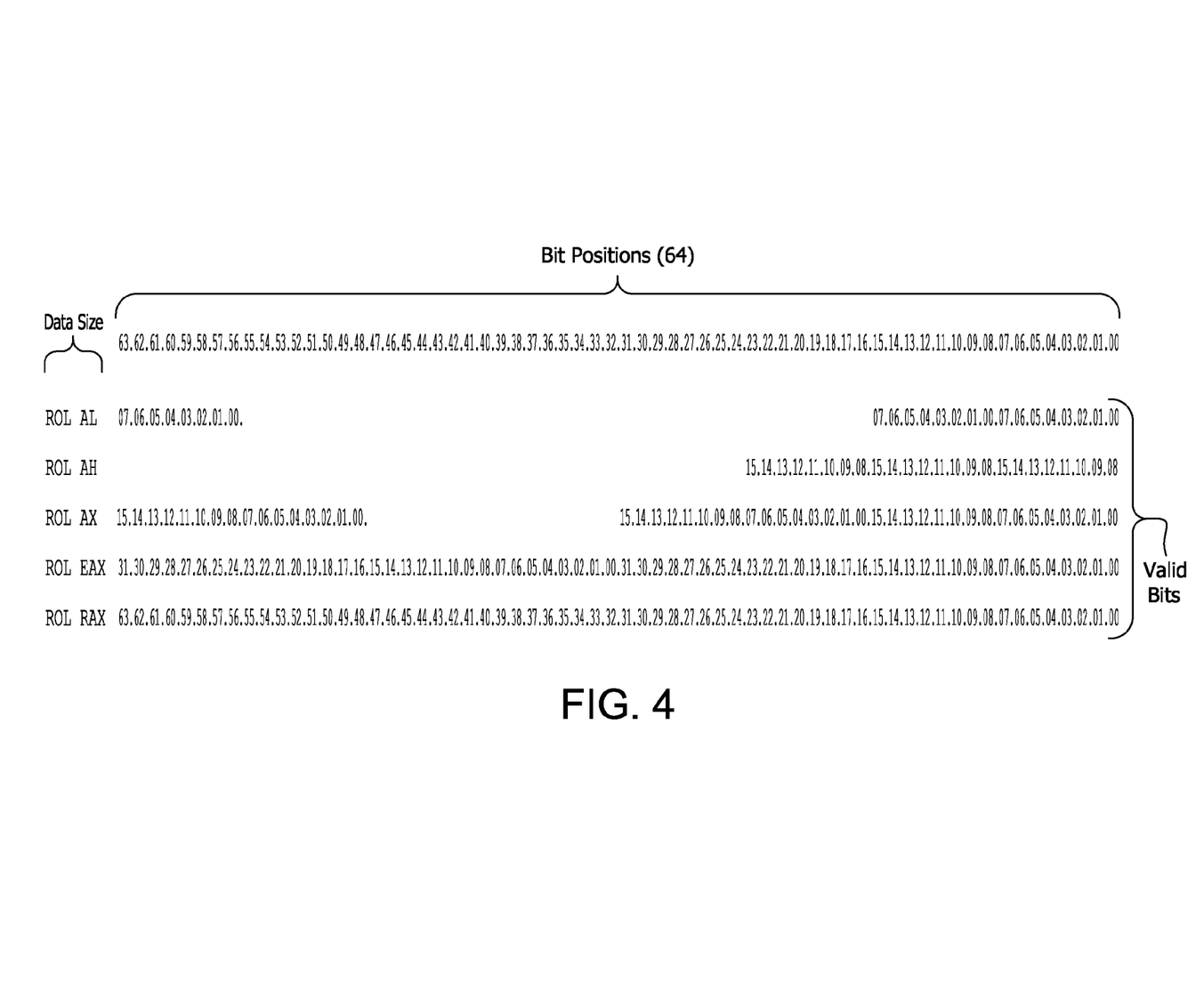
FIG. 4 shows an example of inserting valid bits output by an input multiplexer (MUX) in the rotator/shifter of FIG. 3A into a predetermined number of bit positions.

FIG. 4 shows an example of inserting each of the valid bits 336 output by the input MUX 302 into at least one of a predetermined number (e.g., 64) bit positions. In this example, a rotate left (ROL) scenario for each data size, (AL, AH, AX, EAX and RAX), is illustrated by FIG. 4. For an AL or AH data size, (i.e., 8 valid bits), it is not necessary to replicate the valid data 8 times, since any shift greater than 8 may be represented with a shift amount below 8. For example, a shift amount of 9, 17, 25, 33, 41, 49 or 57 for an AL data size will generate the same rotated data as for a shift amount of 1. Thus, the replication of valid data for various data sizes by the input MUX 302 may be reduced, which saves silicon logic area.

The source B data 332, for example, may include six bits including a first set of bits "XXX" and a second set of bits "YYY" that, together as "XXXYYY", indicate the number of bit positions by which the rotator array 304 may rotate the valid bits 336. The first set of bits ("XXX") may indicate to the byte MUX logic 324 of the rotator array 304 how many bytes to rotate by, and the second set of bits ("YYY") may indicate to the bit MUX logic 326 of the rotator array 304 how many bits to rotate by. The byte MUX logic 324 and the bit MUX logic 326 may, for example, be an 8:1 MUX having 8 select inputs and 1 output, thus each requiring an 8 bit input where only one of the 8 select inputs is a logic 1 (i.e., "one hot").

For example, if the source B data 332 is "001001", the rotator decoder 308 may convert this data into formatted data 338 required by the byte MUX logic 324 and the bit MUX logic 326 in the rotator array 304, (e.g., two separate 8 bit signals for each of the byte MUX logic 324 and the bit MUX logic 326), such that the rotator array 304 rotates the valid bits 336 by 9 bits, (i.e., (XXX=001=1 byte=8 bits)+(YYY=001=1 bit)). In another example, if the source B data 332 is "010 001", the rotator decoder 308 may convert this data into a formatted data 338 required by the byte MUX logic 324 and the bit MUX logic 326 in the rotator array 304 such that the rotator array 304 rotates the valid bits 336 by 17 bits, (i.e., (XXX=010=2 bytes=16 bits)+(YYY=001=1 bit)).

In addition, since the rotator array 304 may be configured to only perform right rotation (ROR) or left rotation (ROL), the rotator decoder 308 may configured to convert the source B data 332 based on operation command 340 such that the source B data 332 is applicable to the rotation direction used by the rotator array 304. The operation command may indicate one of six (6) operations: ROR, ROL, SAL, SHL, SAR and SHR. For example, if the rotator array 304 rotates data to the left, the rotator decoder 308 may convert ROR formatted data, as indicated by the operation command 340, to an ROL format. For an "RAX" data size (64 bits), a right rotation of 47 bits (XXXYYY=101111) may be converted to a left rotation of 17 bits by the rotator decoder 308 calculating the 2's complement of the 47 bits, where (101111)$_2$2=010000+1=010001=17. Alternatively, if the rotator array 304 only rotates data to the right, the rotator decoder 308 may convert ROL formatted data, as indicated by the operation command 340, to an ROR format in a similar manner.

The output MUX 306 receives rotated data 342 from the rotator array 304. The output MUX decoder 306 receives the source B data 332 and the operation command 340, and outputs shift select data 344 required by the output MUX 306 to mask some of the bits of the rotated data 342 by a predetermined number of bit positions (e.g., 17 bit positions) for the shift operations. The output MUX 306 replaces the bits that are shifted out by either zeros, in the case of an SHL (identical to shift arithmetic left (SAL)) or SHR operation, or by the most significant bit (MSB) of the source A data 332 in the case of an SAR operation. The shift select data 344 may be used by the output MUX 306 to select between the rotated data 342 and preselected zeros/MSBs to generate a rotate/shift result 346, depending on the operation.

Referring to FIG. 3A, the input MUX 302 is further configured to output valid bits LSB 348 and a sign bit 350. The bit MUX logic 326 is further configured to output a most significant bit (MSB) 352, an MSB-1 354 and an LSB 356. Thus, for the example of 64 bits, the MSB 352 is 63, the MSB-1 354 is 62 and the LSB 356 is 0. The logic unit 312 outputs a select control output 358 based on the source B data 332, the data size 334 and the operation command 340. The logic unit 312 may be configured to compare the shift amount (from the source B data 332) to the data size 334 to make its selection decisions based on the comparison and the operation command 340. The select control output 358 of the logic unit 312 may be used to select the outputs of MUXs 314, 316 and 318.

As shown in FIG. 3A, the logic unit 312 may be configured to use its select control output 358 to control the MUX 314 to output either a logic 0, the valid bits LSB 348, the MSB 352, the LSB 356 or the sign bit 350 as a carry flag 360. The logic unit 312 may be further configured to use its select control output 358 to control the MUX 318 to output either the sign bit 350, the MSB 352 or a logic 0 as a sign flag 364. The logic unit 312 may be further configured to use its select control output 358 to control the MUX 316 to output either the sign bit 350, the output 366 of the XOR gate 320, the output 368 of the XOR gate 322 or a logic 0 as an overflow flag 362. The output 366 of the XOR gate 320 is an XOR function of the MSB 352 and the MSB-1 354. The output 368 of the XOR gate 322 is an XOR function of the carry flag 360 and the MSB 352.

The following conditions may be used as a basis for setting the carry flag 360. The carry flag 360 may be used to extend the amount of bits supported by the shift and rotate operations.

The carry flag 360 may be set based on the last bit shifted out, which is the MSB 352 of the rotated data if it is shifted to the right, or the LSB 356 of the rotated data if it is shifted to the left.

This condition is only applicable if the shift amount is less than the data size 344 (i.e., no overshift occurs). For example, if there are 4 bits: 3, 2, 1 and 0, and if the operation 340 is "SHR 1", the bits are shifted to the right by one (1) bit, the 0 is shifted out, and the rotated data is 0, 3, 2 and 1. Thus, the 0 is the last bit shifted out, which is the MSB of the rotated data, and the carry flag 360 is set to the MSB (0). In another example, if there are 4 bits: 3, 2, 1 and 0, and if the operation 340 is "SHL 1", the bits are shifted to the left by one (1) bit, and the rotated data becomes 2, 1, 0 and 3. Thus, the 3 is the last bit shifted out, which is the LSB of the rotated data. Thus, the carry flag 360 is set to the LSB (3).

If the shift amount is equal to the data size 334, (e.g., "SHR 4" and "SHL 4")), an equivalent shift may occur and the carry flag 360 is set to the sign bit 350, which is the MSB of the source A data 330 for shift right operations and LSB of the source A data 330 for shift left operations If the shift amount is greater than the data size 334, (e.g., "SHR 5" and "SHL 5") and the operation command 340 is not an SAR, an overshift may occur and the carry flag is set to logic 0.

If the shift amount is greater than the data size 334, (e.g., "SHR 5" and "SHL 5") and the operation command 340 is an SAR, an overshift may occur and the carry flag is set to the sign bit 350, which is the MSB of the source A data 330.

The following conditions may be used as a basis for setting the sign flag 364. The sign flag 364 indicates whether the result 346 is a positive or negative number.

The sign flag 364 is set to the MSB 352 when the operation command 340 is a rotate operation.

The sign flag 364 is set to the MSB 352 when the operation command 340 is an SHL and an overshift does not occur.

The sign flag 364 is set to the sign bit 350 when the operation command 340 is an SAR or SHR and the shift amount is 0.

The sign flag 364 is set to a logic 0 when the operation command 340 is an SHR and the shift amount is not 0.

The following conditions may be used as a basis for setting the overflow flag 362. The overflow flag 362 indicates that a data overflow exists whereby there are not a sufficient number of bits to store the data, including the carry flag 360.

If the operation command 340 is an SHR and the shift count is one (1), the overflow flag 360 is set to the sign bit 350, which is the MSB of the source A data 330.

If the operation command 340 is an SHL or ROL, the overflow flag 360 is set to result 368 of XORing the MSB 352 with the carry flag 360, which is performed by the XOR gate 322.

If the operation command 340 is an ROR, the overflow flag 360 is set to result 366 of XORing the MSB 352 with the MSB-1 354, which is performed by the XOR gate 320.

If the operation command 340 is an SAR or SHR, the overflow flag 360 is set to a logic 0.

The flags generated by the rotator/shifter 215 of FIG. 3A need to have the same latency as the shifter result. This is a difficult problem because most of the time, the flag values are dependent on the result values and the latency may be 1 or 2 gate delays more than the result itself.

Figure 3B:
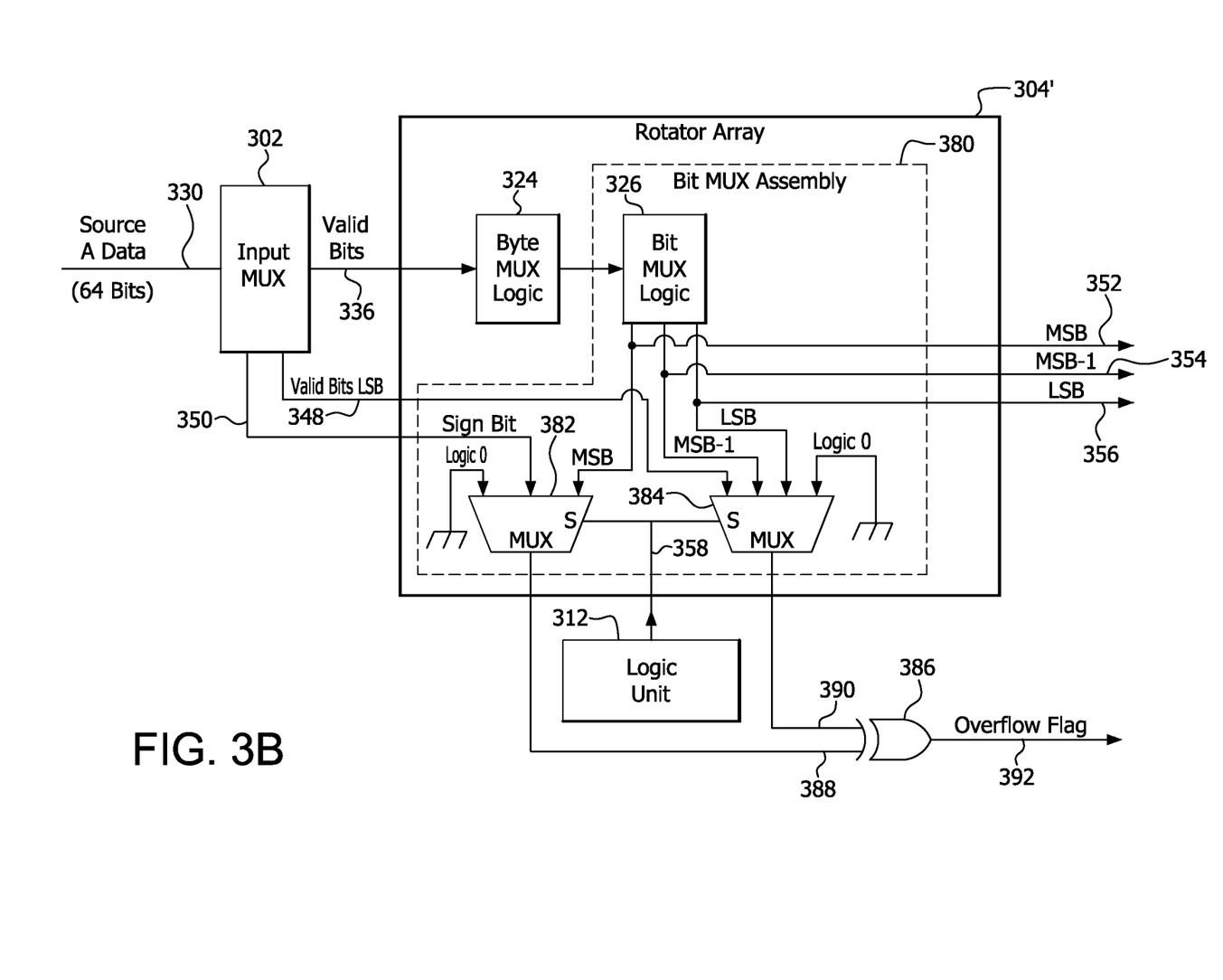
FIG. 3B shows an alternative embodiment for generating an overflow flag.

FIG. 3B shows an alternative embodiment for generating an overflow flag using a rotator array 304' including the byte MUX logic 324 and a bit MUX assembly 380 including the bit MUX logic 326 and two additional MUXes 382 and 384, and an XOR gate 386. As shown in FIG. 3B, the logic unit 312 may be configured to use its select control output 358 to control a MUX 382 to output either a logic 0, the sign bit 350 or the MSB 352 to the XOR gate 386 as input 388, and to control a MUX 384 to output either the valid bits LSB 348, the MSB−1 354, the LSB 356 or a logic 0 to the XOR gate 386 as input 390. The XOR gate generates the overflow flag 392 based on the inputs 388 and 390.

Figure 5A:
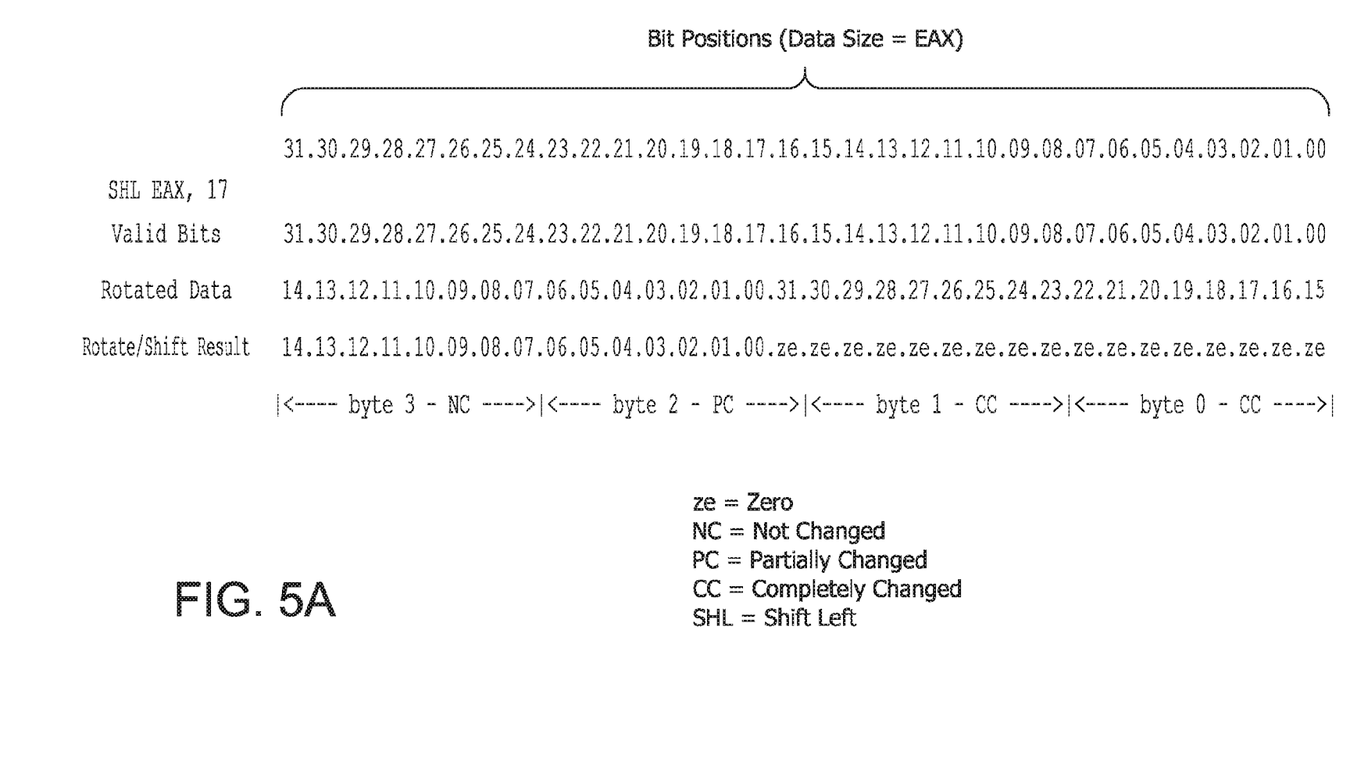
FIGS. 5A and 5B show examples of shift operations performed by the rotator/shifter of FIG. 3A.

FIG. 5A shows an example of the outputs of the input MUX 302, the rotator array 304 and the output MUX 306 of the rotator/shifter 215 of FIG. 3A for a shift left (SHL) of 17 bits where bytes 0 and 1 are complete changed (CC), byte 2 is partially changed (PC), and the actual amount is decoded, and byte 3 is not changed (NC) and is the same as the rotated data 342.

Figure 5B:
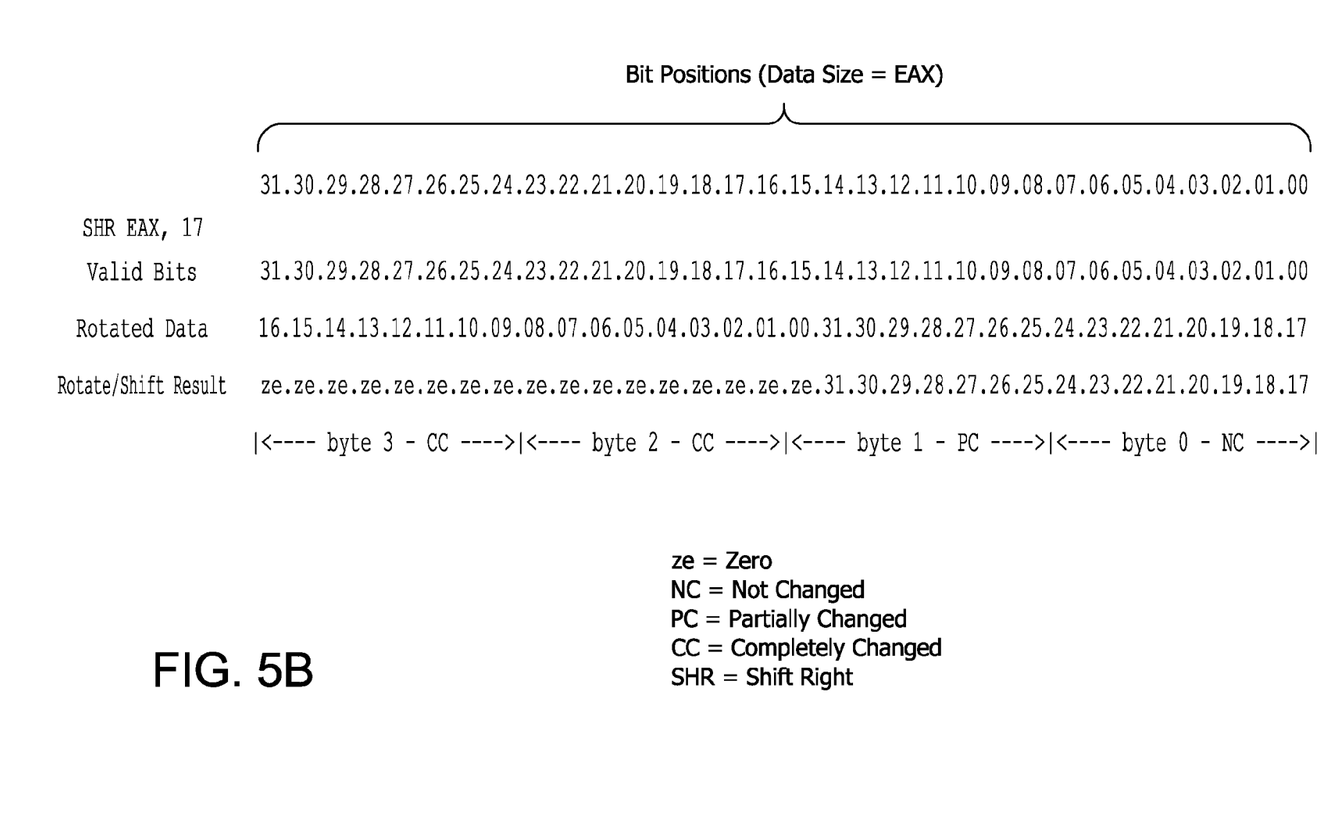

FIG. 5B shows an example of the outputs of the input MUX 302, the rotator array 304 and the output MUX 306 of the rotator/shifter 215 of FIG. 3A for a shift right (SHR) of 17 bits where byte 0 is not changed (NC) and is the same as the rotated data 342, byte 1 is partially changed (PC), and the actual amount is decoded, and bytes 2 and 3 are completely changed (CC).

Figure 6:
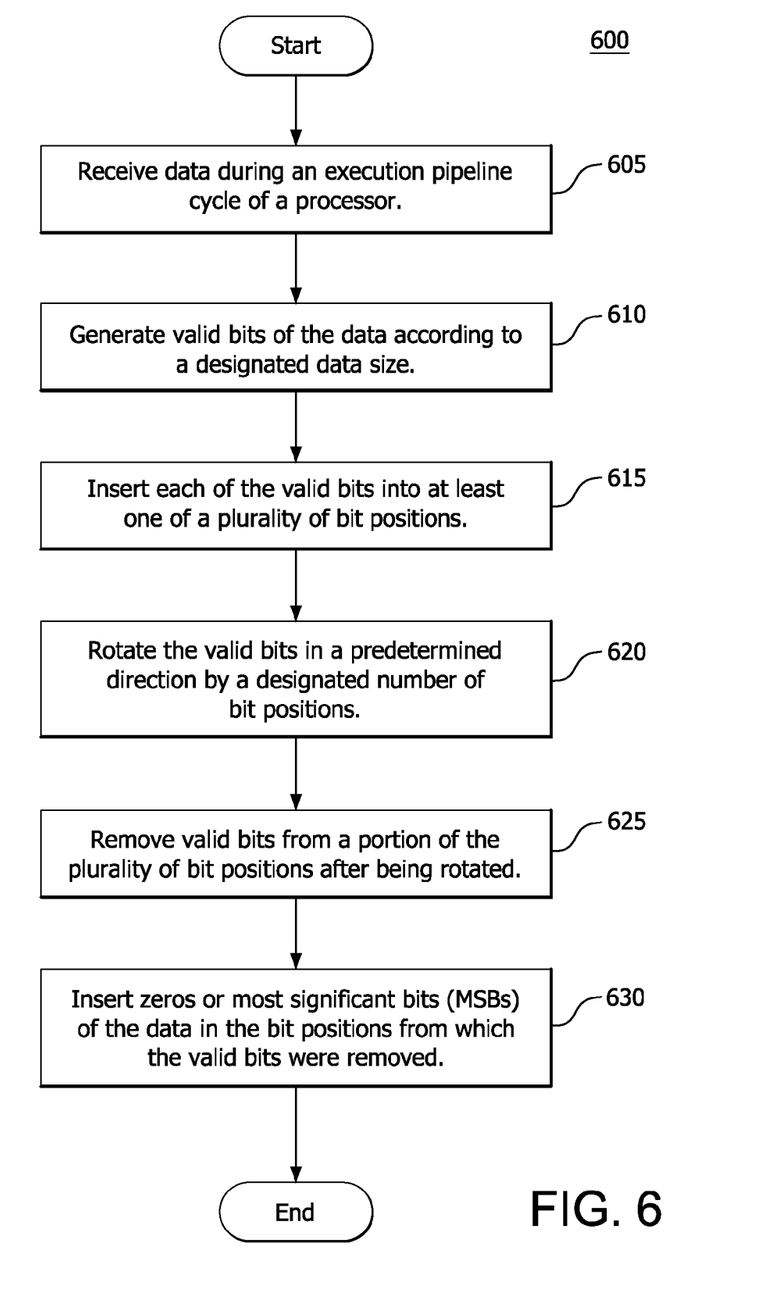
FIG. 6 is a flow diagram of a procedure for processing data during an execution pipeline cycle of a processor.

FIG. 6 is a flow diagram of a procedure 600 for processing data during an execution pipeline cycle of a processor. Data is received during an EX pipeline cycle of a processor (605). Valid bits of the data are generated according to a designated data size (610). Each of the valid bits is inserted into at least one of a plurality of bit positions (615). The valid bits are rotated in a predetermined direction by a designated number of bit positions (620). Valid bits are removed from a portion of the plurality of bit positions after being rotated (625). Zeros or most significant bits (MSBs) of the data are inserted in the bit positions from which the valid bits were removed (630).

Figure 7:
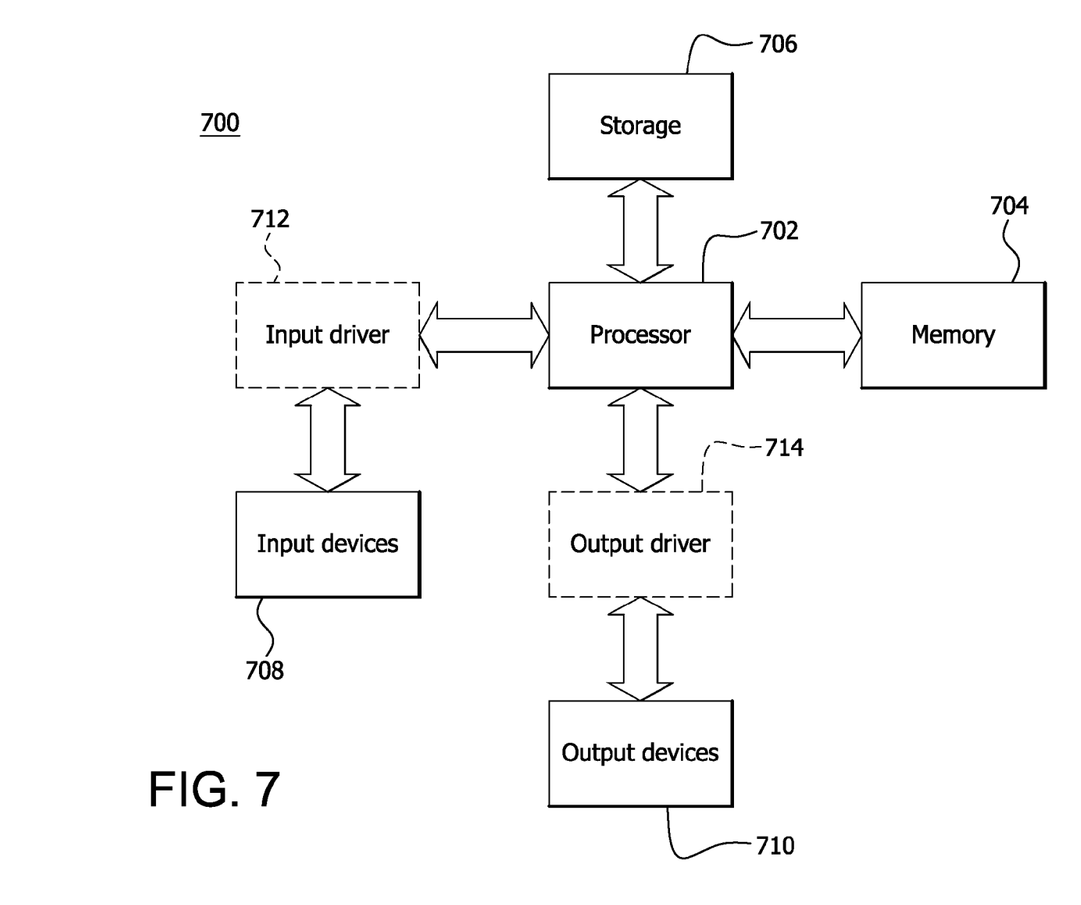
FIG. 7 is a block diagram of an example device in which one or more disclosed embodiments may be implemented.

FIG. 7 is a block diagram of an example device 700 in which one or more disclosed embodiments may be implemented. The device 700 may include, for example, a computer, a gaming device, a handheld device, a set-top box, a television, a mobile phone, or a tablet computer. The device 700 includes a processor 702, a memory 704, a storage 706, one or more input devices 708, and one or more output devices 710. The device 700 may also optionally include an input driver 712 and an output driver 714. It is understood that the device 700 may include additional components not shown in FIG. 7.

The processor 702 may include a central processing unit (CPU), a graphics processing unit (GPU), a CPU and GPU located on the same die, or one or more processor cores, wherein each processor core may be a CPU or a GPU. The memory 704 may be located on the same die as the processor 702, or may be located separately from the processor 702. The memory 704 may include a volatile or non-volatile memory, for example, random access memory (RAM), dynamic RAM, or a cache.

The storage 706 may include a fixed or removable storage, for example, a hard disk drive, a solid state drive, an optical disk, or a flash drive. The input devices 708 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 710 may include a display, a speaker, a printer, a haptic feedback device, one or more lights, an antenna, or a network connection (e.g., a wireless local area network card for transmission and/or reception of wireless IEEE 802 signals).

The input driver 712 communicates with the processor 702 and the input devices 708, and permits the processor 702 to receive input from the input devices 708. The output driver 714 communicates with the processor 702 and the output devices 710, and permits the processor 702 to send output to the output devices 710. It is noted that the input driver 712 and the output driver 714 are optional components, and that the device 700 will operate in the same manner is the input driver 712 and the output driver 714 are not present.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), an accelerated processing unit (APU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method of generating flags in response to processing data during an execution pipeline cycle of a processor, the method comprising:

generating valid bits for received data comprising a plurality of bits according to a received designated data size indicating how many of the plurality of bits of the received data comprise the valid bits;

receiving a shift or rotate operation command;

receiving information indicating how many bytes and bits to rotate the received data or shift the received data;

generating rotated data using: the valid bits; the shift operation command or rotate operation command; and the information;

replacing one or more of the valid bits shifted out of the received data with one or more replacement bits comprising one of: (i) one or more most significant bits (MSBs) of the valid bits; and (ii) one or more logic zero bits;

generate a rotate-shift result by selecting between the one or more replacement bits and the rotated data;

comparing (i) the received designated data size indicating how many of the plurality of bits of received data comprise the valid bits to (ii) the received information indicating how many bytes and bits to rotate the received data or shift the received data; and controlling generation of a carry flag, an overflow flag, and a sign flag by selecting between a plurality of carry flag selections, a plurality of overflow flag selections, and a plurality of sign flag selections based on the received shift operation command or rotate operation command and the comparison of the received designated data size indicating how many of the plurality of bits of received data comprise the valid bits to the received information indicating how many bytes and bits to rotate the received data or shift the received data, wherein the carry flag, the overflow flag, and the sign flag are generated within a single cycle of the generating of the rotate-shift result.

2. The method of claim 1 wherein the shift or rotate operation command indicates that the received data is to be rotated to the left or right.

3. The method of claim 1 wherein the shift or rotate operation command indicates that the received data is to be shifted to the left or right.

4. The method of claim 1, wherein the carry flag is set to a last bit shifted or rotated out when the received data is shifted by an amount of bits less than the designated data size.

5. The method of claim 1, further comprising:
shifting the received data by an amount of bits equal to the designated data size;
setting the carry flag to the most significant bit (MSB) of the received data for right shifts; and
setting the carry flag to the least significant bit (LSB) of the received data for left shifts.

6. The method of claim 1, further comprising:
shifting the received data by an amount of bits greater than the designated data size;
setting the carry flag to the most significant bit (MSB) of the received data, when a shift arithmetic right (SAR) operation is performed; and
setting the carry flag to a logic zero when an SAR is not performed.

7. The method of claim 1, further comprising:
shifting the received data to the right by one bit; and
setting the overflow flag to the most significant bit (MSB) of the received data, when a shift right (SHR) operation is performed.

8. The method of claim 1, further comprising:
shifting or rotating the received data to the left; and
setting the overflow flag to an XOR function of the most significant bit (MSB) of the shifted or rotated data and the carry flag.

9. The method of claim 1, further comprising:
rotating the received data to the right; and
setting the overflow flag to an XOR function of the most significant bit (MSB) of the rotated data and the second-most significant bit (MSB-1 of the rotated data.

10. The method of claim 1, further comprising:
performing a shift arithmetic right (SAR) operation on the received data; and
setting the overflow flag to a logic zero.

11. The method of claim 1, further comprising:
rotating the received data to the left; and
setting the sign flag to the most significant bit (MSB) of the rotated data.

12. The method of claim 1, further comprising:
performing a shift left (SHL) operation on the received data without shifting the received data by an amount of bits more than the designated data size; and
setting the sign flag to the most significant bit (MSB) of the shifted data.

13. The method of claim 1, further comprising:
performing a shift arithmetic right (SAR) or shift right (SHR) operation on the received data without shifting the received data; and
setting the sign flag to the most significant bit (MSB) of the received data.

14. The method of claim 1, further comprising:
performing a shift right (SHR) operation on the received data by shifting the received data by at least one bit; and
setting the sign flag to a logic zero.

15. A processor, comprising:
an input multiplexer configured to generate valid bits for source data comprising a plurality of bits according to a designated data size, the designated data size indicating how many of the plurality of bits of the source data comprise the valid bits;
a rotator array configured to generate rotated data using: the valid bits; a shift operation command or a rotate operation command; and information indicating how many bytes and bits to rotate the source data or shift the source data;
an output multiplexor configured to:
replace one or more of the valid bits shifted out of the source data with one or more replacement bits comprising one of: (i) one or more most significant bits (MSBs) of the valid bits; and (ii) one or more logic zero bits; and
generate a rotate-shift result by selecting between the one or more replacement bits and the rotated data; and
a logic unit configured to:
compare (i) the designated data size to (ii) the information indicating how many bytes and bits to rotate the source data or shift the source data; and
control generation of a carry flag, an overflow flag, and a sign flag by selecting between a plurality of carry flag selections, a plurality of overflow flag selections, and a plurality of sign flag selections based on the shift operation command or rotate operation command and the comparison of (i) the designated data size to (ii) the information indicating how many bytes and bits to rotate the source data or shift the source data,
wherein the designated data size, the shift or rotate operation command and the information indicating how many bytes and bits to rotate the source data or shift the source data are each provided in parallel to the output multiplexor and the logic unit.

16. A non-transitory computer-readable storage medium comprising a set of instructions used for manufacturing a semiconductor device, wherein the semiconductor device comprises:
- an input multiplexer configured to generate valid bits for source data comprising a plurality of bits according to a designated data size, the designated data size indicating how many of the plurality of bits of the source data comprise the valid bits;
- a rotator array configured to generate rotated data using: the valid bits; a shift or a rotate operation command; and information indicating how many bytes and bits to rotate or shift the source data;
- an output multiplexor configured to:
  - replace one or more of the valid bits shifted out of the source data with one or more replacement bits comprising one of: (i) one or more most significant bits (MSBs) of the valid bits; and (ii) one or more logic zero bits;
  - generate a rotate-shift result by selecting between the one or more replacement bits and the rotated data;
- a logic unit configured to:
  - compare (i) the designated data size to (ii) the information indicating how many bytes and bits to rotate the source data or shift the source data; and
  - control generation of a carry flag, an overflow flag, and a sign flag by selecting between a plurality of carry flag selections, a plurality of overflow flag selections, and a plurality of sign flag selections based on the shift or rotate operation command and the comparison of (i) the designated data size to (ii) the information indicating how many bytes and bits to rotate the data or shift the data,
- wherein the designated data size, the shift or rotate operation command and the information indicating how many bytes and bits to rotate the source data or shift the source data are each provided in parallel to the output multiplexor and the logic unit.

17. The non-transitory computer-readable storage medium of claim 16 wherein the instructions are Verilog data instructions.

18. The non-transitory computer-readable storage medium of claim 16 wherein the instructions are hardware description language (HDL) instructions.

* * * * *